Aug. 18, 1964    E. A. RAGER ETAL    3,144,812
EMERGENCY ACTUATOR FOR AIR BRAKE SYSTEM
Filed Sept. 5, 1961    2 Sheets-Sheet 1
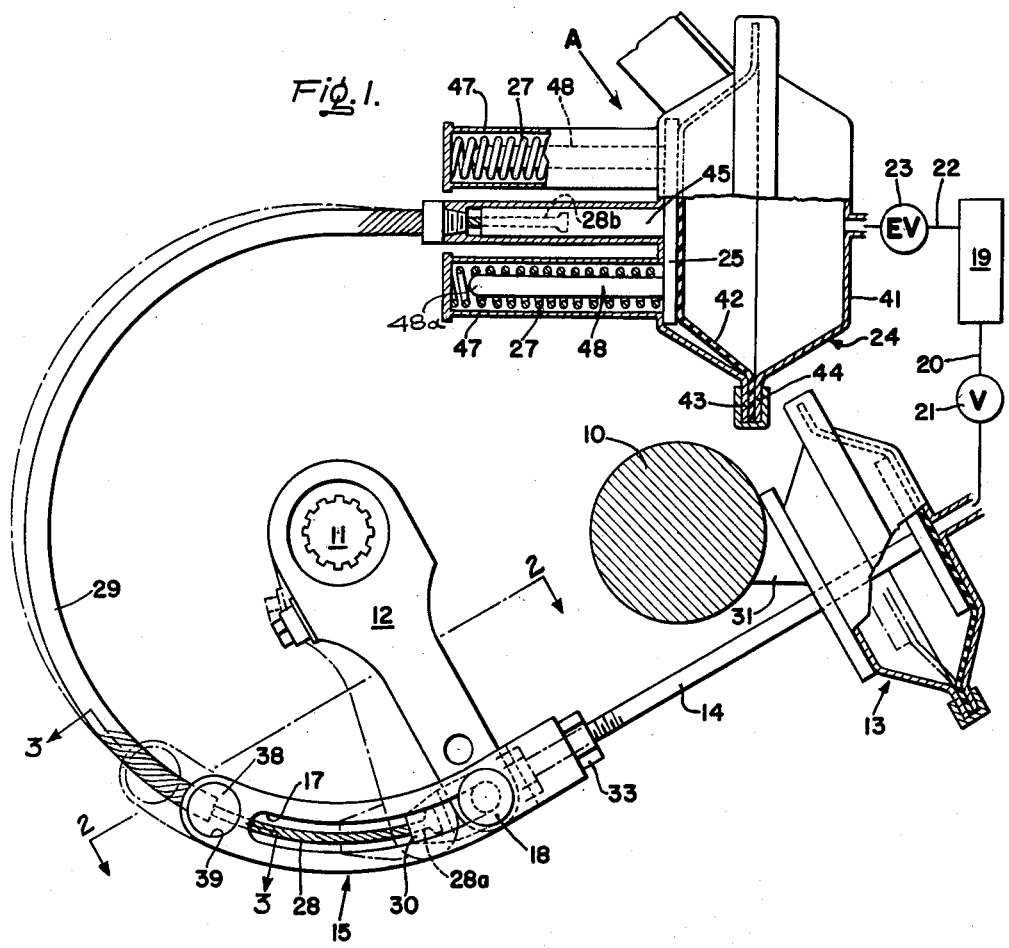
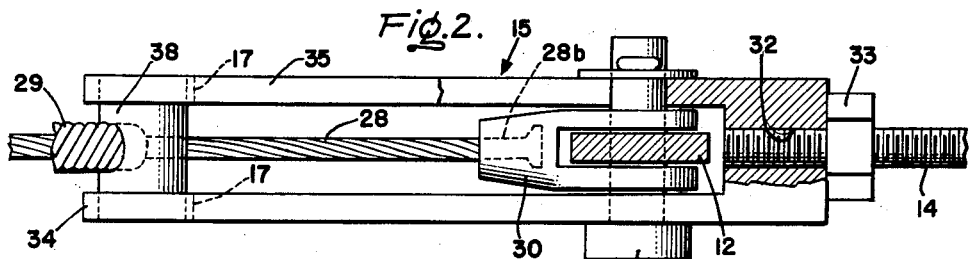
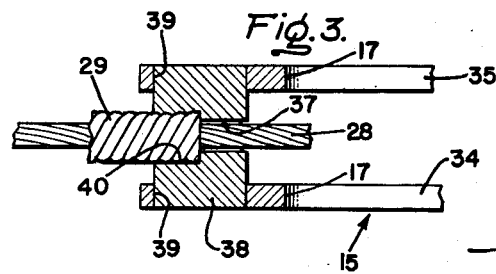
INVENTORS:
EDGAR A. RAGER
WILLIE T. DAVIS
FRANKLIN F. DAY
BY
Hansen and Laue
ATTORNEYS.

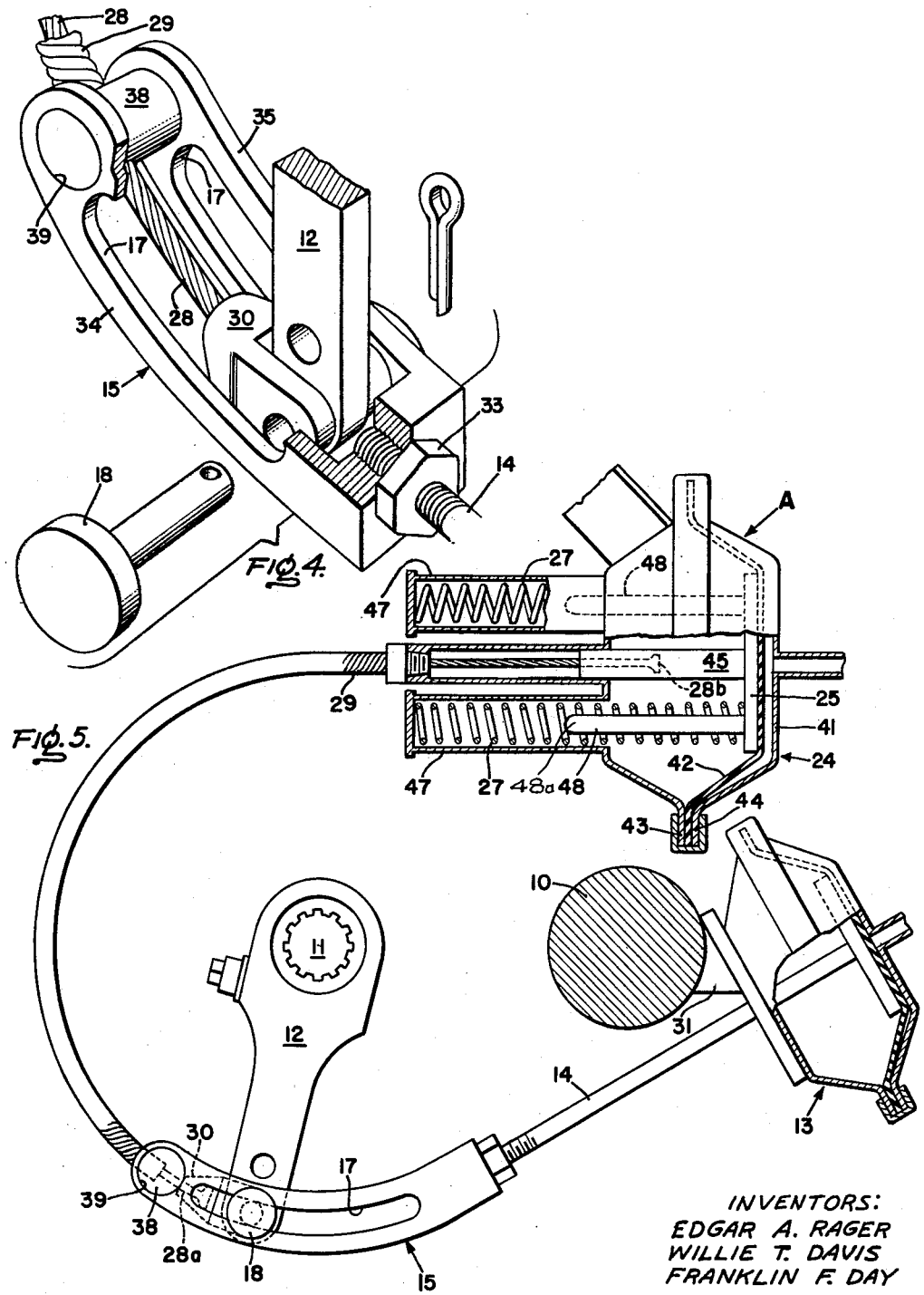

United States Patent Office 3,144,812
Patented Aug. 18, 1964

3,144,812
EMERGENCY ACTUATOR FOR AIR BRAKE SYSTEM
Edgar A. Rager and Willie T. Davis, San Jose, and Franklin F. Day, Saratoga, Calif., assignors, by direct and mesne assignments, to Explorer Research Co., a corporation of California
Filed Sept. 5, 1961, Ser. No. 136,013
8 Claims. (Cl. 91—170)

The present invention relates to vehicle brakes, and pertains more particularly to an emergency brake actuating mechanism for a vehicle having an air pressure actuated braking system mounted thereon.

Thousands of truck-trailer combinations are used for hauling various goods and commodities throughout the United States and other countries, and most of these truck-trailer combinations are equipped with air actuated brakes. The usual air brake system of such a truck-trailer combination comprises an air cylinder mounted on an axle of the trailer and having its piston rod pivotally connected to the free end of a brake arm having adjustable, splined connection with a brake actuating cam shaft.

When the brakes of these large cargo trailers become overheated, as they sometimes do when the trailer on which they are mounted is rolling down a long grade, the brake drums expand, thereby requiring a continuously greater expansive movement of the brake shoes in order for the latter to retain proper braking relation with the drums. In the event that the brake drums become thus expanded beyond effective reach of the brake shoes with the brake actuating air cylinder in its maximum actuated condition, the brakes become ineffective, or "fade," and a runaway may result. Such runaways sometimes end in disaster. Also, in the event of a failure in the means for supplying compressed air to the system, the brakes are also rendered inoperative.

The present invention contemplates the provision of an emergency brake actuating mechanism for incorporation in a vehicle air brake system whereby, upon a predetermined reduction of pressure in the compressed air supply for the regular air brake system of such vehicle, or upon actuation of an emergency vent valve, the brakes of such vehicle are set to their maximum limit of operation, even where such maximum limit of operation is beyond the limit of movement of the brakes by the regular air brake system of such vehicle.

Another object of the invention is to provide an emergency brake actuating mechanism for use with a vehicle air brake system, wherein a slip link is mounted for thrust actuation by a normal actuation of an air cylinder of such system to actuate a brake arm, emergency brake actuating mechanism being operatively connected to the compressed air supply of such system so that upon failure of the normal air brake actuating mechanism of such system the brake arm is swung along the slip link by the emergency brake actuating mechanism toward a maximum brake setting position.

Another object of the invention is to provide an improved, emergency brake actuating mechanism for a vehicle having air brakes.

These, and other objects and advantages of the invention, will be apparent from the following description and the accompanying drawings, wherein:

FIG. 1 is a somewhat diagrammatic, side elevational view of a mechanism embodying the present invention as it appears when mounted on the braking system of a highway type cargo trailer, the solid lines showing the parts in their normal, brake releasing condition, the broken lines showing the condition of the parts during a normal braking operation.

FIG. 2 is an enlarged, fragmentary, sectional view taken along line 2—2 of FIG. 1, and showing only the solid line portions of FIG. 1.

FIG. 3 is a similarly enlarged, fragmentary, sectional view taken along line 3—3 of FIG. 1.

FIG. 4 is a fragmentary, perspective view of the portions of the mechanism shown in FIG. 2, a shackle guide pin and its retaining cotter pin being shown withdrawn from their respective holes.

FIG. 5 is a side elevational view, generally similar to FIG. 1, but showing the emergency brake actuating mechanism in fully operated condition.

Briefly, the form of the invention illustrated in FIGS. 1–5 is incorporated in the air brake system of a conventional truck-trailer (not shown) having usual trailer axle 10, brake actuating cam shaft 11, and brake actuating arm or "slack adjuster" 12, hereinafter referred to as "brake arm." A conventional, primary, brake actuating air cylinder or "pot" 13 is mounted on the axle 10, and the usual piston rod 14 of the primary pot 13 is connected to a slip link 15 of the present invention having a slotted opening 17 therein, the right hand end of which opening, as illustrated, is arranged for thrust engagement with a shackle guide pin 18 which is inserted through a hole provided therefor in the free end of the brake arm 12.

A compressed air tank 19, which may be the compressed air tank for a conventional air brake system, is connected by a primary high pressure air line 20, through a conventional, self venting air brake valve 21, to the primary air pot 13. When compressed air is admitted to the pot 13 from the tank 19, the piston rod 14 is thereby extended to its broken line position of FIG. 1, moving the brake arm 12 toward its broken line, brake setting position of FIG. 1.

A second high pressure air line 22 extends from the tank 19 (FIG. 1) through a normally open emergency vent valve 23 to a second air pot 24 forming part of an emergency brake actuating mechanism A (FIGS. 1 and 5). When compressed air at normal operating pressure enters the second pot 24 through the line 22, such air moves the piston 25 of this second pot, against the thrust of a plurality of powerful compression springs 27, to its fully air actuated, inoperative position of FIG. 1.

An emergency brake actuating cable 28 is connected from the piston 25 of the second pot 24, through a flexible compression housing 29, to a shackle 30 (FIG. 2) attached by the pin 18 to the brake arm 12. When air pressure in the second pot 24 drops below the compressive force of the springs 27, the latter urge the piston 25, and with it the emergency brake actuating cable 28, toward their maximum spring actuated condition shown in FIG. 5, thereby moving the pin 18 along the slotted opening 17 and swinging the brake arm 12 in which said pin is inserted toward its maximum, emergency, brake setting position of FIG. 5.

Referring to the drawings in greater detail, the truck axle 10, brake actuating cam shaft 11, and brake arm 12, may all be of well known types commonly employed in the air brake systems of highway cargo truck and trailers, and need not therefore be described in further detail herein. For the purposes of the present description the brake arm 12 is assumed to be rigidly secured to the brake actuating cam shaft 11, athough it will be obvious to one familiar with truck-trailer air brake mechanisms that it is of a well known type provided with conventional slack adjusting means. The latter are not material to the present invention, and will not, therefore, be illustrated or described herein.

The conventional, primary, air actuated pot 13 is fixedly mounted on a bracket 31, secured to the trailer axle 10, and usual brake release springs (not shown) urge the cam shaft 11 and brake arm 12 thereon in a counterclockwise, rotative direction, as viewed in FIGS. 1 and 5, toward their normal, unactuated condition shown in solid lines in FIG. 1.

The elongated slip link 15 is provided with a threaded hole 32 extending lengthwise into an end thereof, and into this hole is screwed the threaded end portion of the piston rod 14 of the primary air pot 13. The piston rod 14 anchored in threadedly adjusted position in the slip link 15 by a conventional lock nut 33. The slip link 15 is bifurcated, as best shown in FIGS. 2, 3 and 4, the two legs 34 and 35 thereof being flat and parallel in plan as shown in FIG. 2. These legs 34 and 35 are curved in side elevation, as shown in FIGS. 1 and 5, along a common radius substantially equal to the effective length of a brake arm 12 with which the slip link 15 is to be used. The link legs 34 and 35, as best shown in FIG. 2, are spaced apart by a distance substantially greater than the thickness of the free end of the brake arm 12 which rides between these legs. The shackle 30, which is of a width to fit for free slidable movement between the slip link legs 34 and 35, is connected to the free end of the brake arm 12 by the elongated shackle guide pin 18.

The link legs 34 and 35 have similar, elongated, slotted, laterally opposite openings 17 therein of a width to receive the pin 18 for free slidable movement therealong. The slotted openings 17 are curved concentrically with their respective link legs 34 and 35. One end 28a of the emergency brake actuating cable 28 is swaged in a conventional manner into a hole provided therefor in the shackle 30, and said cable passes through a hole 37 (FIG. 3) provided therefor in a fair-lead member 38. The latter is mounted in a pair of laterally aligned holes 39 provided therefor in the free ends of the link legs 34 and 35, and extends transversely therebetween.

The flexible thrust housing 29, which may be of closely coiled wire, has one end thereof seated in a recess 40 counterbored in the outer side of the fair lead 38 coaxially with the cable hole 37 therein, and the cable 28 is threaded for free, longitudinal, slidable movement through the hole 37 in the fair-lead 38 and through the thrust housing 29. The cable 28 and its enclosing thrust housing are brought in a smooth curve to the emergency brake actuating mechanism A, which may be secured, as by means of a conventional bracket (not shown) to a desired part of a trailer upon which the illustrated brake system is mounted, for example, beneath the body or bed thereof.

The emergency brake actuating mechanism A comprises the second air cylinder or pot 24, which preferably is of substantially greater depth than the primary air pot 13. The second air pot 24 has a usual piston 25 mounted therein and sealed to the housing 41 by a flexible diaphragm 42, the marginal edge of the diaphragm being gripped and sealed between cooperating flanges 43 and 44 of the housing 41. A center post 45 is provided on the piston 25, and the other end 28b of the emergency brake actuating cable 28 is secured, as by swaging, in a hole provided therefor in the free end of the piston center post 45.

The plurality of powerful springs 27 are mounted in compression between the piston 25 and a plurality of individual, hollow, cylindrical spring housings 47, each of the latter having an open end thereof secured to the pot housing 41 and opening thereinto. A plurality of spring guide pins 48 are also secured to the plate 25, and are positioned for free guiding movement, one into each of the coil springs 27. The free ends 48a of the guide pins 48 preferably are rounded to prevent snagging on their associated springs in the event that such springs should tend to bend laterally.

The operation of the illustrated embodiment of the invention is as follows:

Assuming that the air brake mechanism shown in FIGS. 1–5 is mounted in operative condition on a conventional highway cargo trailer, with air at a suitable operating pressure feeding from the compressed air tank 19 (FIG. 1) through the primary air line 20 and the brake control valve 21 to the primary brake actuating air pot 13. The air brake control valve 21 may be operatively connected in a conventional manner to a brake pedal (not shown) in the driver's compartment of a truck-tractor used for towing such trailer.

At all times when the normal braking system is operative, compressed air will be supplied through the second air line 22 and normally open emergency valve 23 to the second pot 24, thereby forcing the piston 25 of the emergency actuating mechanism A to compress the springs 27. This action moves the emergency brake actuating cable 28 through its thrust housing 29 and fair lead 38 toward the shackle 30, urging the latter and its interconnected pin 18 and brake arm 12, assisted by the usual brake releasing springs (not shown), in a counterclockwise direction as viewed in FIGS. 1 and 5 until the pin 18 engages the ends of the slotted link openings 17 nearest the piston rod 14 of the primary pot 13 as shown in FIG. 1.

In this air-actuated condition of the emergency brake actuating mechanism A, when the normal brake actuating air valve 21 is operated to admit compressed air to the primary air pot 13 from the air tank 19, the piston rod 14 of the primary air pot 13 is thereby extended, and moves the slip link 15 mounted on said piston rod from its brake releasing, solid-line position of FIG. 1, toward its actuated, broken line position thereof. In so moving, the right hand ends of the slots 17 as viewed in FIG. 1 thrust the shackle guide pin 18 and the brake arm 12 connected thereto in a clockwise direction toward their broken line, brake actuating condition of FIG. 1.

Upon the release of the self-venting brake valve 21 to vent the primary air pot 13, the usual brake release springs (not shown) urge the brake actuating cam shaft 11 and brake arm 12 secured thereto in a counterclockwise direction thereby returning the parts to their normal, unactuated, solid line condition of FIG. 1. During such normal operation of the brake mechanism the flexible thrust housing 29 and the portion of the emergency actuating cable 28 enclosed therein merely flex or bow outwardly and back, as between the solid and broken line positions thereof of FIG. 1, and with no longitudinal movement of the cable 28 in its thrust housing 29, or of the pin 18 along its guide slots 17.

Upon a failure of the air system sufficient to cause a reduction of air pressure within the second pot 24 of the emergency actuating mechanism A sufficient to permit the powerful compression springs 27 to move the piston 25 toward the right from its bottomed, air actuated, brake releasing position of FIG. 1 toward its spring actuated, emergency braking position of FIG. 5, the emergency actuating cable 28 will be drawn by such movement of the piston 25 through its thrust housing 29 and the fair lead 38, and will forcibly urge the shackle 30, and its interconnected pin 18 and brake arm 12, in a clockwise direction as viewed in FIGS. 1 and 5, moving the pin 18 toward the left along its guide slots 17, and swinging the brake arm 12 toward full, emergency, brake actuating position as shown in FIG. 5.

Since the emergency brake mechanism pot 24 is preferably deeper than the primary or normal brake actuating pot 13 of the air brake system which it is incorporated, the brake arm 12 and its connected brake actuating cam shaft 11 can be moved by actuation of the emergency actuating mechanism A well beyond the maximum limit of movement of said members by the normal brake actuating pot 13. Therefore, even though the brakes should "fade" due to extreme overheating while a vehicle upon which a braking system embodying the present invention is mounted is on a long down grade, the emergency valve 23 may be operated to thereby shut off the compressed air supply from the tank 19 and simultaneously release pressure from the pot 24 of the emergency actuating mechanism A. Thereupon, regardless of the condition of the normal or primary brake actuating pot 13, the emergency actuating cable 28 will be drawn forcibly through its housing 29 by the action of the powerful springs 27 on the piston plate 25, and will thereby urge the brake arm 12 and its interconnected, brake actuating cam shaft 11 toward an extreme brake actuating condition beyond the limit of movement of said parts by the normal brake actuating pot 13.

The invention provides a simple, inexpensive, and positively acting emergency brake actuating mechanism for use on an air brake equipped vehicle, and one which is capable of setting the brakes of such vehicle well beyond the limit of movement thereof which is possible by means of the normal brake actuating mechanism of such vehicle. Use of the invention requires but little change in the normal air brake system of such vehicle, and, except during an emergency braking operation, permits the normal brake actuating mechanism to operate substantially in its normal designed manner.

The present invention also requires no extraneous power source beyond that available from the normal air brake system itself. Furthermore, the present invention operates automatically and in a desirable "fail safe" manner, so as to automatically set the brakes upon the occurrence of a designed pressure drop in the system, regardless of the condition of the normal brake actuating pot 13 at such time.

While we have illustrated and described a preferred embodiment of the present invention, it will be understood, however, that various changes and modifications may be made in the details thereof without departing from the scope of the invention as set forth in the appended claims.

Having thus described the invention, what we claim as new and desire to protect by Letters Patent is defined in the following claims.

1. Emergency brake actuating mechanism for a motor vehicle equipped with an air brake system of the type which includes a supply of compressed air, a brake actuating cam shaft, a brake arm secured thereto, a primary brake actuating air pot having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
 (a) a slip-link on the free end of the piston rod,
 (b) thrust means on the slip-link for thrust engagement with the free end of the brake arm in a brake setting direction upon controlled actuation of the primary air pot for normal brake setting operation,
 (c) said brake arm being movable away from thrust engagement with said thrust means along said slip-link member in a brake setting direction,
 (d) and a tension member interconnecting the free end of the brake arm to said spring means for biasing the tension member and the brake arm to which it is connected in a brake setting direction, the limit of movement of the brake arm by the spring means being greater than its limit of movement by the primary air pot,
whereby, upon a designed drop in pressure in the compressed air supply, the secondary air pressure actuated means releases the spring means, which thereupon, by means of the tension member, biases the free end of the brake arm along the slip-link and clear of the thrust means to an emergency brake setting position beyond the limit of movement of the brake arm and its cam shaft by the primary air pot.

2. Emergency brake actuating mechanism for a motor vehicle equipped with an air brake system of the type which includes a supply of compressed air, a brake actuating cam shaft, a brake arm secured thereto, a primary brake actuating air pot having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
 (a) means on the piston rod for thrust engagement with the free end of the brake arm in a brake setting direction upon controlled actuation of the primary air pot for normal brake setting operation,
 (b) said brake arm being movable away from thrust engagement with said thrust means in a brake setting direction,
 (c) and a member interconnecting the free end of the brake arm to said spring means for biasing the brake arm to which it is connected in a brake setting direction independently of the piston rod, the limit of movement of the brake arm by the spring means being greater than its limit of movement by the primary air pot,
whereby, upon a designed drop in pressure in the compressed air supply, the secondary air pressure actuated means releases the spring means, which thereupon, by means of the tension member, biases the free end of the brake arm along the slip-link and clear of the thrust means to an emergency brake setting position beyond the limit of movement of the brake arm and its cam shaft by the primary air pot .

3. Emergency brake actuating mechanism for a motor vehicle equipped with an air brake system of the type which includes a supply of compressed air, a brake actuating cam shaft, a brake arm secured thereto, a primary brake actuating air pot having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
 (a) a slip-link on the free end of the piston rod,
 (b) thrust means on the slip-link for thrust engagement with the free end of the brake arm in a brake setting direction upon controlled actuation of the primary air pot for normal brake setting operation,
 (c) said brake arm being movable away from thrust engagement with said thrust means along said slip-link member in a brake setting direction,
 (d) and a flexible cable interconnecting the free end of the brake arm to said spring means for biasing the tension member and the brake arm to which it is connected in a brake setting direction, the limit of movement of the brake arm by the spring means being greater than its limit of movement by the primary air pot,
whereby, upon a designed drop in pressure in the compressed air supply, the secondary air pressure actuated means releases the spring means, which thereupon, by means of the tension member, biases the free end of the brake arm along the slip-link and clear of the thrust mean to an emergency brake setting position beyond the limit of movement of the brake arm and its cam shaft by the primary air pot.

4. Emergency brake actuating mechanism for a motor vehicle equipped with an air brake system of the type which includes a supply of compressed air, a brake actuating cam shaft, a brake arm secured thereto, a primary brake actuating air pot having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
  (a) thrust means actuated by the piston rod within the limit of movement thereof for thrust engagement with the free end of the brake arm in a brake setting direction upon controlled actuation of the primary air pot for normal brake setting operation,
  (b) said brake arm being movable away from thrust engagement with said thrust means in a brake setting direction,
  (c) a fair lead on the thrust means,
  (d) and a flexible cable interconnecting the free end of the brake arm to said spring means for biasing the tension member and the brake arm to which it is connected in a brake setting direction upon operation of the spring means, the limit of movement of the brake arm by the spring means being greater than its limit of movement by the primary air pot,
whereby, upon a designed drop in pressure in the compressed air supply, the secondary air pressure actuated means releases the spring means, which thereupon, by means of the tension member, biases the free end of the brake arm along the slip-link and clear of the thust means to an emergency brake setting position beyond the limit of movement of the brake arm and its cam shaft by the primary air pot.

5. Emergency brake actuating mechanism for a motor vehicle equipped with an air brake system of the type which includes a supply of compressed air, a brake actuating cam shaft, a brake arm secured thereto, a primary brake actuating air pot, having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
  (a) a thrust element operatively connected to the piston rod for thrust movement of the brake arm toward brake setting position upon an air actuation extension of the piston rod
  (b) said brake arm being movable for guided movement away from thrust engagement with said thrust element in a brake setting direction,
  (c) and a tension member interconnecting the free end of the brake arm to said spring means for biasing the tension member and the brake arm to which it is connected in a brake setting direction, the limit of movement of the brake arm by the spring means being greater than its limit of movement by the primary air pot,
whereby, upon a designed drop in pressure in the compressed air supply, the secondary air pressure actuated means releases the spring means, which thereupon, by means of the tension member, biases the free end of the brake arm along the slip-link and clear of the thrust means to an emergency brake setting position beyond the limit of movement of the brake arm and its cam shaft by the primary air pot.

6. Emergency brake actuating mechanism for a motor vehicle equipped with an air brake system of the type which includes a supply of compressed air, a brake actuating cam shaft, a brake arm secured thereto, a primary brake actuating air pot having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
  (a) thrust means actuated by the piston rod for thrust engagement with the free end of the brake arm in a brake setting direction upon controlled actuation of the primary air pot for normal brake setting operation,
  (b) said brake arm being movable away from thrust engagement with said thrust means member in a brake setting direction beyond the limit of movement of the thrust means by the piston,
  (c) and means operatively interconnecting the free end of the brake arm to said spring means for biasing the tension member and the brake arm to which it is connected in a brake setting direction, the limit of movement of the brake arm by the spring means being greater than its limit of movement by the primary air pot,
whereby, upon a designed drop in pressure in the compressed air supply, the secondary air pressure actuated means releases the spring means, which thereupon, by means of the tension member, biases the free end of the brake arm along the slip-link and clear of the thrust means to an emergency brake setting position beyond the limit of movement of the brake arm and its cam shaft by the primary air pot.

7. Emergency brake actuating mechanism for a motor vehicle equipped with an air brake system of the type which includes a supply of compressed air, a brake actuating cam shaft, a brake arm secured thereto, a primary brake actuating air pot having a piston therein and communicating with the compressed air supply through an operator controlled valve, a piston rod mounted for limited movement by the piston of the primary air pot, powerful spring means emergency brake operation, and secondary air pressure actuated means communicating with the compressed air supply and acting oppositely to said spring means with sufficient force, at a designed operating pressure of the compressed air supply, to move the spring means to inoperative position; said emergency brake actuating mechanism comprising
  (a) a longitudinal extension on the piston rod,
  (b) the extension having a longitudinally extending slotted guideway therein of greater length than the limit of piston movement,
  (c) thrust means on the inner end of the guideway for urging the brake arm in a brake setting direction upon actuation of the primary air pot for normay brake setting operation,
  (d) said brake arm being movable along said guideway away from thrust engagement with said thrust means in a brake setting direction,
  (e) a fair lead on the outer end of the guideway,
  (f) and a cable interconnecting the free end of the brake arm to said spring means and running through the fair lead for biasing the brake arm to which it is connected in a brake setting direction independently of the piston rod, the limit of movement of the brake arm by the spring means being greater than its limit of movement by the primary air pot, whereby, upon a designed drop in pressure in the compressed air supply, the secondary air pressure actuated means releases the spring means, which thereupon, by means of the tension member, biases the free end of the brake arm along the slip-link and clear of the trust means to an emergency brake setting position beyond the limit of movement of the brake arm and its cam shaft by the primary air pot.

8. An arrangement according to claim 7 wherein the cable is mounted for slidable movement in a flexible compression sleeve, which is in endwise engagement at one end thereof with the fair lead and at the other end thereof with a fixed member adjacent the spring means.

References Cited in the file of this patent
UNITED STATES PATENTS

| | | |
|---|---|---|
| 1,553,493 | Allen | Sept. 15, 1925 |
| 1,560,037 | Bushey | Nov. 3, 1925 |
| 2,409,908 | Simpkins | Oct. 22, 1946 |
| 2,664,973 | Colley | Jan. 5, 1954 |

UNITED STATES PATENT OFFICE
CERTIFICATE OF CORRECTION

Patent No. 3,144,812                      August 18, 1964

Edgar A. Rager et al.

It is hereby certified that error appears in the above numbered patent requiring correction and that the said Letters Patent should read as corrected below.

Column 5, line 50, column 6, lines 13 and 50, column 7, lines 13 and 52, and column 8, lines 14 and 53, after "means", each occurrence, insert -- for --; column 6, line 37, for "tension" read -- interconnecting --; same column 6, line 38, column 7, line 40, column 8, lines 2 and 41, and column 9, line 8, strike out "along the slip-link and", each occurrence; column 6, lines 67 and 75, column 7, lines 31 and 39, and column 9, line 7, for "tension member", each occurrence, read -- cable --; column 8, line 3, for "means" read -- element --; line 32, for "tension member" read -- latter-said means --; same column 8, line 40, for "the tension member" read -- said latter-said means --; column 9, line 8, for "trust" read -- thrust --.

Signed and sealed this 27th day of July 1965.

(SEAL)
Attest:

ERNEST W. SWIDER                      EDWARD J. BRENNER
Attesting Officer                  Commissioner of Patents